US011188199B2

(12) United States Patent
Pinel et al.

(10) Patent No.: US 11,188,199 B2
(45) Date of Patent: Nov. 30, 2021

(54) SYSTEM ENABLING AUDIO-BASED NAVIGATION AND PRESENTATION OF A WEBSITE

(71) Applicant: International Business Machines Corporation, Armonk, NY (US)

(72) Inventors: Florian Pinel, New York, NY (US); Donna K. Byron, Petersham, MA (US); Christian Ewen, New York, NY (US); Carmine Dimascio, West Roxbury, MA (US); Benjamin L. Johnson, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 15/954,206

(22) Filed: Apr. 16, 2018

(65) Prior Publication Data

US 2019/0317648 A1 Oct. 17, 2019

(51) Int. Cl.
*G06F 3/0483* (2013.01)
*G06F 3/0482* (2013.01)
*G06F 3/16* (2006.01)

(52) U.S. Cl.
CPC .......... *G06F 3/0483* (2013.01); *G06F 3/0482* (2013.01); *G06F 3/167* (2013.01)

(58) Field of Classification Search
CPC ....... G06F 3/0483; G06F 3/0482; G06F 3/167
See application file for complete search history.

(56) References Cited

U.S. PATENT DOCUMENTS

| 6,101,473 | A | 8/2000 | Scott et al. |
| 9,620,124 | B2 | 4/2017 | Wlodkowski et al. |
| 9,690,854 | B2 | 6/2017 | Stent et al. |
| 2004/0128136 | A1 | 7/2004 | Polad |

(Continued)

OTHER PUBLICATIONS

Lau, Tessa, et al., "Towards Conversational Interfaces to Web Applications," Proceedings of Fifth Workshop on Human-Computer Interaction and Information Retrieval (HCIR), Mountain View, CA, Oct. 2011, 4 pages.

(Continued)

*Primary Examiner* — Jennifer N Welch
*Assistant Examiner* — Reji Kartholy
(74) *Attorney, Agent, or Firm* — Troutman Pepper Hamilton Sanders LLP

(57) ABSTRACT

A website navigation system has an analysis system which receives a request for an Internet web page from a client device. The analysis system receives web page data associated with the web page from the Internet and performs a data analysis process to organize the web page data for use in a virtual conversation with the user in order to present the web page in an audible format. The analysis system identifies separate elements of the web page from the web page data and extracts information from the separate elements based on the web page data. The analysis system groups the separate elements into categories based on the extracted information and sorts the groups of separate elements based on usage statistics. The analysis system then generates a prompt for being output to the user by the client device as audible output based on the sorted groups of separate elements.

11 Claims, 7 Drawing Sheets

(56) References Cited

U.S. PATENT DOCUMENTS

| | | | | |
|---|---|---|---|---|
| 2007/0213980 | A1* | 9/2007 | Danner | G06Q 20/16 704/231 |
| 2008/0195674 | A1* | 8/2008 | Kim | G06F 16/957 |
| 2010/0094635 | A1 | 4/2010 | Bermudez Perez | |
| 2011/0099495 | A1* | 4/2011 | Harrington | H04N 1/00464 715/765 |
| 2012/0041903 | A1 | 2/2012 | Beilby et al. | |
| 2012/0260263 | A1 | 10/2012 | Edoja | |
| 2013/0031091 | A1* | 1/2013 | El Daher | G06F 16/957 707/723 |
| 2013/0275577 | A1* | 10/2013 | Lim | G06F 16/9577 709/224 |
| 2015/0149168 | A1* | 5/2015 | Stent | G10L 15/26 704/235 |
| 2016/0179465 | A1* | 6/2016 | Clark | G06F 16/9566 455/414.1 |
| 2018/0013639 | A1* | 1/2018 | Sanders | H04L 43/026 |
| 2018/0025012 | A1* | 1/2018 | Cao | H04L 67/02 707/740 |
| 2018/0358022 | A1* | 12/2018 | Karnati | G10L 15/1815 |

OTHER PUBLICATIONS

Ashok, Vikas, et al., "Capti-Speak: A Speech-Enabled Web Screen Reader," Proceedings of the 12th Web for All Conference, ACM, 2015, 10 pages.

Ashok, Vikas, et al., "Web Screen Reading Automation Assistance Using Semantic Abstraction," Proceedings of the 22nd International Conference on Intelligent User Interfaces, pp. 407-418, ACM, 2017.

IBM, "Run-time Enhancement of Hyperlinks for Enabling Speech Assisted Web Browsing," IP.com No. IPCOM000029046D, Jun. 14, 2004, 10 pages.

Screen Readers: list of screen readers by the American Foundation for the Blind, 2018, 9 pages. Retrieved from the Interet: URL: http://www.afb.org/prodBrowseCatResults.aspx?CatID=49 [retrieved on Apr. 16, 2018].

Borodin, Yevgen, et al., "The HearSay Non-Visual Web Browser," W4A2004—Challenge, May 7-8, 2007, 2 pages.

SPACE10, "Introducing the Conversation Form," Nov. 28, 2016, 9 pages. Retrieved from the Internet: URL: https://medium.com/conversational-interfaces/introducing-the-conversational-form-c3166eb2ee2f [retrieved on Apr. 16, 2018].

Perez, Sarah, "Heek is a chatbot that can build you a website," Oct. 3, 2016, 13 pages. Retrieved from the Internet: URL: https://techcrunch.com/2016/10/03/heek-is-a-chatbot-that-can-build-you-a-website/ [retrieved on Apr. 16, 2018].

Pulipati, Rami, "Speedy Browse Bot: Convert your website to chatbot," Jul. 10, 2016, 5 pages. Retrieved from the Internet: URL: https://blogs.botsplash.com/speedy-browse-bot-convert-your-website-to-chatbot-5adbdca7b94b [retrieved on Apr. 16, 2018].

Similar Web: enabling art, able to accurately classify an unknown website as one of 25 main categories and 219 sub-categories, 7 pages, 2014. Retrieved from the Internet: URL: https://developer.similarweb.com/ [retrieved on Apr. 16, 2018].

Debnath, Sandip, et al., "Automatic Extraction of Informative Blocks from Webpages," SAC '05, Mar. 13-17, 2005, 5 pages.

* cited by examiner

SYSTEM ENABLING AUDIO-BASED NAVIGATION AND PRESENTATION OF A WEBSITE

TECHNICAL FIELD

The present application relates generally to navigation and presentation of information and, more particularly, to voice-controlled navigation and audible presentation of a web site enabled through a virtual conversation.

BACKGROUND

Considering the growing popularity of virtual assistants and smart speakers, there is a larger marketplace for audio and sound-based interfaces. As a result, more and more users may seek to access a website using audio only, such as by having a simulated conversation with a virtual assistant. There is also a need to improve options for visually-impaired users to access information.

Currently, there are some accessibility tools which can convert text into audio output for visually-impaired users. However, these systems generally are only capable of reading selected text or an entire page and cannot consistently make decisions regarding efficient content presentation or selection. This problem is especially evident when accessibility tools are applied to websites.

Many websites have compartmented appearances with many different types of information, including links, navigation tools, headings, content, images, etc. Using current tools, a user may have to wait for an entire web page to be read before hearing a desired option or being able to provide an input selection. If the web page is complicated and includes many different types of information, the audio output may not even make meaningful sense to a user such that a proper selection is even possible. As a result, navigating a website using audio input and output remains a challenge.

The present disclosure is directed to overcoming these and other problems associated with voice control and audio output and providing a more user-friendly approach for navigating and interacting with a website.

SUMMARY

In one aspect, the present disclosure is directed to a computer-implemented method in a data processing system comprising a processing device and a memory comprising instructions which are executed by the processing device to cause the processing device to enable a website for a virtual conversation, the method including receiving a request for an Internet web page associated with a website from a client device, the web page including a plurality of links and retrieving web page data associated with the web page from a device connected to the Internet in response to the request. The method also includes analyzing the web page data according to a data analysis process to produce an organized data set associated with the web page, and generating a prompt for being output to the user as audible output based on the organized data set. The method further includes receiving input from the client device, with the input having been provided to the client device in response to the prompt. The method also includes performing an action based on the input received from the client device, the action including retrieving web page data associated with a new web page based on the selection of a link by the user in response to the prompt.

In another aspect, the present disclosure is directed to a website navigation system. The website navigation system includes an analysis system connected to the Internet. The analysis system is configured to receive a request for an Internet web page associated with a website from a client device and receive web page data associated with the web page from the Internet. The analysis system is further configured to identify, by an identification unit, separate elements of the web page from the web page data and extract, by the identification unit, information from the separate elements based on the web page data. The analysis system is further configured to group, by a categorization unit, the separate elements into categories based on the extracted information, retrieve, by an information unit, usage statistics for the separate elements, and sort, by the categorization unit, the groups of separate elements based on the usage statistics. The analysis system is also configured to generate, by a prompting unit, a prompt for being output to a user by the client device as audible output based on the sorted groups of separate elements.

In yet another aspect, the present disclosure is directed to a client device. The client device includes an audio input device configured to receive audio input from a user, an audio output device configured to provide audio output to the user, a memory configured to store software instructions, and a processing device configured to execute the software instructions to receive input data from the audio input device based on an audible message from the user, and identify a web page from the input data. The processing device is further configured to transmit a request to an analysis system including the web page, receive, from the analysis system, a prompt including a categorized and sorted group of links from the web page, and provide output data to the audio output device for providing the prompt to the user as an audible message.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
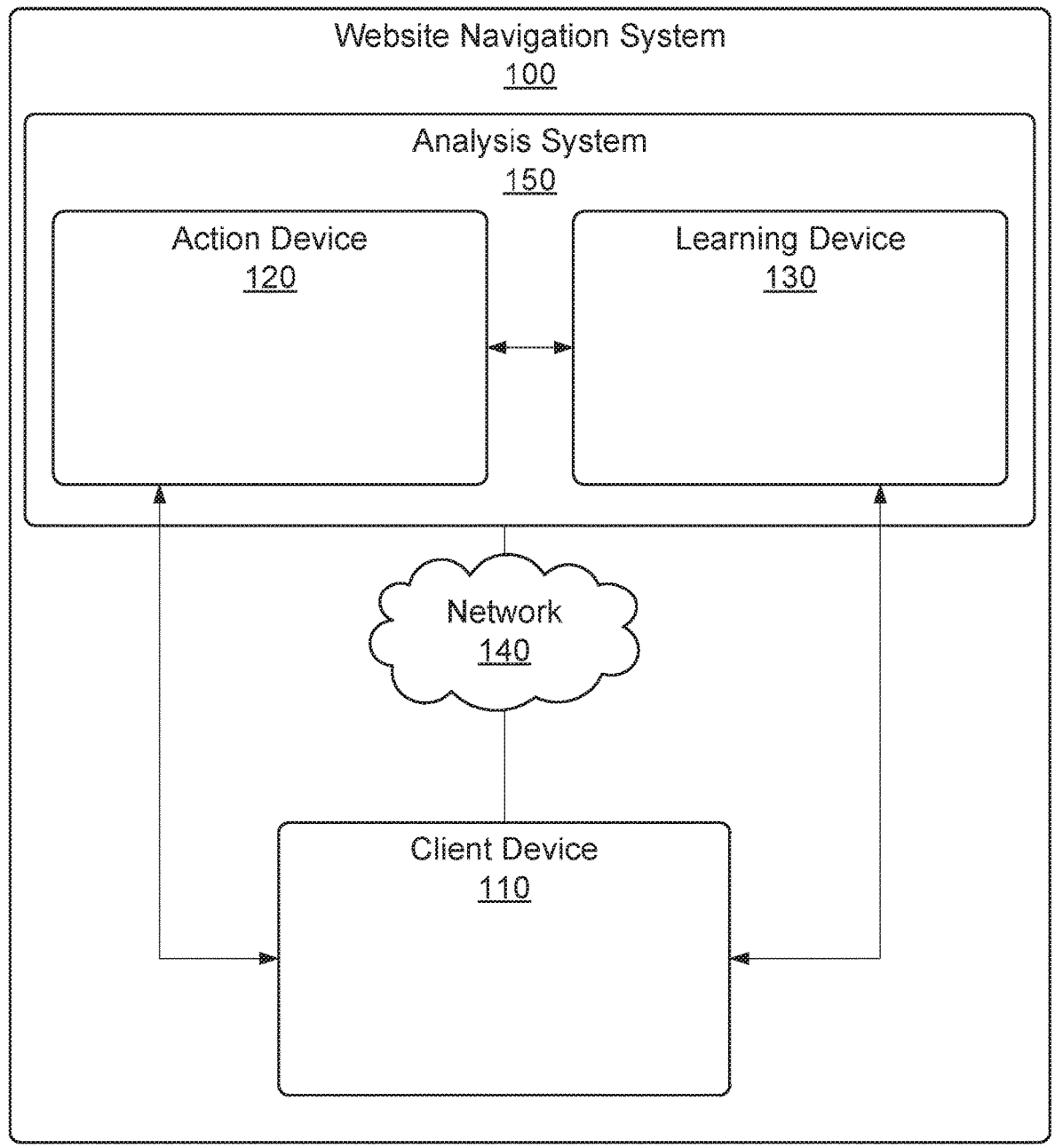
FIG. 1 depicts a schematic diagram of one illustrative embodiment of a website navigation system, consistent with disclosed embodiments.

The present invention may be a system, a method, and/or a computer program product. The computer program product may include a computer readable storage medium (or media) having computer readable program instructions thereon for causing a processing device to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processing device of a general purpose computer, special purpose computer, or other programmable data processing apparatus to produce a machine, such that the instructions, which execute via the processing device of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Smart speakers, such as the Amazon Echo®, Apple Homepod®, and Google Home®, are audio output devices which generally include the integration of a virtual assistant, such as Alexa® or Siri®. These devices allow a user to provide audio input, usually in the form of a conversational question, as a means to cause the smart speaker to provide some audio output, usually in a form that is responsive to the user's request. For example, a user may ask about the weather in the area and or ask for a particular song to be played. The smart speaker analyzes the user's input and provides a response, such as a weather report or the playing of the requested song.

Websites, on the other hand, are configured as visual output for a user to view and interact. A website is typically an Internet destination which is reached when a web browser is directed to an Internet address associated with the website. The website may include one or more web pages that are maintained through the website owner or manager. Each web page may be composed of a variety of elements, some of which may be active elements, such as interactive links which lead to another destination when "clicked on" by a user. For example, a web page may include navigation elements, shortcut elements, a list of products, embedded features, playable media, advertisements, and the like, which are capable of being selected by an input device to direct the web browser to a new destination, such as a new web page of the web site. Other elements of the web page may be inactive in that they are not clickable links. Inactive elements may include the text of an article, profile information, background graphics, or an image.

A website navigation system consistent with disclosed embodiments enables a user to receive information from a website and provide commands to navigate the website using audio output and input, such as through the use of a smart speaker or similarly-configured device. The website navigation system is configured such that the information from the website is presented to the user in an efficient and natural manner and the user can use natural language to navigate and control the presented information. In this way, the website navigation system is configured for efficient, intuitive control by the user, thereby allowing a vision-impaired user to more easily access website information and providing all users a new and useful channel for accessing information without looking at a screen and/or through devices that do not include a screen.

In an exemplary embodiment, the website navigation system is implemented through a computing device, such as a smart speaker or smart phone, which includes audio input and output capabilities. The computing device includes or is connected to an analysis system which has access to the Internet. The analysis system collects website data such as hyperlinks and content and parses the data to categorize information for presentation to the user. For example, the analysis system may identify common patterns which identify links that are associated with headlines so that a list of headlines can be read to the user. In another example, navigation elements may be categorized and provided to the user when a menu feature is selected.

FIG. 1 depicts a schematic diagram of one illustrative embodiment of a website navigation system 100. The website navigation system 100 includes a client device 110, an action device 120, and a learning device 130 which are connected through a network 140. The client device 110, action device 120, and learning device 130 are functionally represented as singular separate components but it should be understood that the disclosed embodiments are not so limited. Moreover, the devices may be combined in some embodiments. For example, in some embodiments, the action device 120 and the learning device 130 are components of an analysis system 150. The analysis system 150 may be a backend computing device which includes the action device 120 and learning device 130 as combined or separate components.

The client device 110 communicates with the analysis system 150 either directly or through the network 140. The client device 110 is configured to interface with a user in order to provide audio output and receive audio input. The client device 110 is further configured to transmit data via one or more communication channels to one or more components of the analysis system 150. For example, the client device 110 may transmit requests to the analysis system 150 for information, such as website data from the action device 120. The analysis system 150 may provide the information to the client device 110, including action prompts or website content which is output to the user by the client device 110.

The client device 110 may be implemented in hardware and/or software and may include various constituent components which form the client device 110. These components may include, for example, a processing device in communication with a memory and one or more software or hardware modules and/or units for executing software instructions, and one or more input and output devices, such as a speaker for providing audio output and a microphone for capturing audio input.

In some embodiments, the client device 110 is a smart speaker (e.g., devices which rely primarily on audio input and output to interface with a user). In other embodiments, the client device 110 may be a smart phone or tablet which includes a screen for visual output, but which also includes audio input and output devices. In still other embodiments, the client device 110 is a laptop or desktop computer. The client device 110 is not limited to these devices as the disclosed features may be integrated into any user-interfacing device. For example, the client device 110 may be a vehicle, kitchen appliance, robotic device, toy, etc. In some embodiments, the client device 110 may include a web browser installed thereon for navigating to websites.

The action device 120 may be implemented in hardware and/or software and may include various constituent components which form the action device 120. These components may include various modules and/or units which, for example, parse website data, extract link information, categorize collected data, query other units, modules, devices and/or systems, generate prompts, analyze received input, and perform navigating actions. Moreover, the action device 120 may include communication components configured to allow the action device 120 to communicate with other elements of the website navigation system 100.

The action device 120 may be a backend computing device, such as a server connected to the Internet. In other embodiments, the action device 120 may be a smartphone, tablet, or personal computer connected to the client device 110 through a Wi-Fi or Bluetooth® connection (which may be part of the network 140). In alternative embodiments, the action device 120 may be integrated into the client device 110. For example, the client device 110 may be a smart phone or tablet with the action device 120 built into the same system as software or hardware modules and/or units.

The learning device 130 may be implemented in hardware and/or software and may include various constituent components which form the learning device 130. These components may include various modules and/or units which, for example, crawl the Internet for web site data, identify patterns in website data, train the analysis device, and receive feedback from one or more users. The learning device 130 may be configured to store software instructions which the action device 120 may use to perform one or more functions. For example, the action device 120 may communicate with the learning device 130 in order to update one or more categorization rules which are used by the action device 120 to categorize web site data.

The learning device 130 may be a backend computing device, such as a server. The learning device 130 and action device 120 may be combined as a single device. For example, the analysis system 150 may be embodied as a backend server which includes both the action device 120 and the learning device 130. In other embodiments, the learning device 130 is separate from the action device 120. For example, the action device 120 may be a local device, such as a user smart phone, tablet, or personal computer, which communicates with the learning device 130 through the network 140 (e.g., the Internet). In other embodiments, the learning device 130 may be integrated with the client device 110. For example, in some embodiments, each of the client device 110, action device 120, and learning device 130 may be integrated into one device, such as a smart speaker, smart phone, tablet, or personal computer. The learning device 130 may provide information to the action device 120, such as website data, updates, or learning data.

Together the action device 120 and learning device 130 may form the analysis system 150 which serves as an intermediary between the client device 110 and Internet websites. The analysis system 150 is specially configured to systematically analyze websites and break down the elements and content of the associated web pages in a manner that allows the information to be presented within a virtual conversation with a user of the client device 110. For example, a user may request "headlines from CNN" and the analysis system 150 will find CNN.com, identify the headlines, and provide an output instruction for reading the headlines to the user. The analysis system 150 may further cause the client device to read the content of an article associated with the headline upon selection by the user by navigating to the web page associated with the headline, identifying the elements on the page associated with the article, and providing the text to the client device 110. The analysis system 150 is configured to apply this and similar concepts across any of a variety of websites and web pages in order to present web page information and respond to user requests in an intuitive and efficient manner, as opposed to previously available systems which merely convert text to audible speech.

The network 140 may be a local or global network and may include wired and/or wireless components and functionality which enable communication between the client device 110, action device 120, and the learning device 130. The network may be embodied by the Internet, provided at least in part via cloud services, and/or may include one or more communication devices or systems which enable data transfer to and from the systems and components of the client device 110, action device 120, and/or learning device 130. The network 140 may additionally or alternatively include local network connections, such as Wi-Fi connections or Bluetooth® connections.

In accordance with some exemplary embodiments, the elements of the website navigation system 100 include logic implemented in specialized hardware, software executed on hardware, or any combination of specialized hardware and software executed on hardware, for implementing the website navigation system 100. In some exemplary embodiments, the website navigation system 100 may be or include the IBM Watson system available from International Business Machines Corporation of Armonk, N.Y., which is augmented with the mechanisms of the illustrative embodiments described hereafter.

Figure 2:
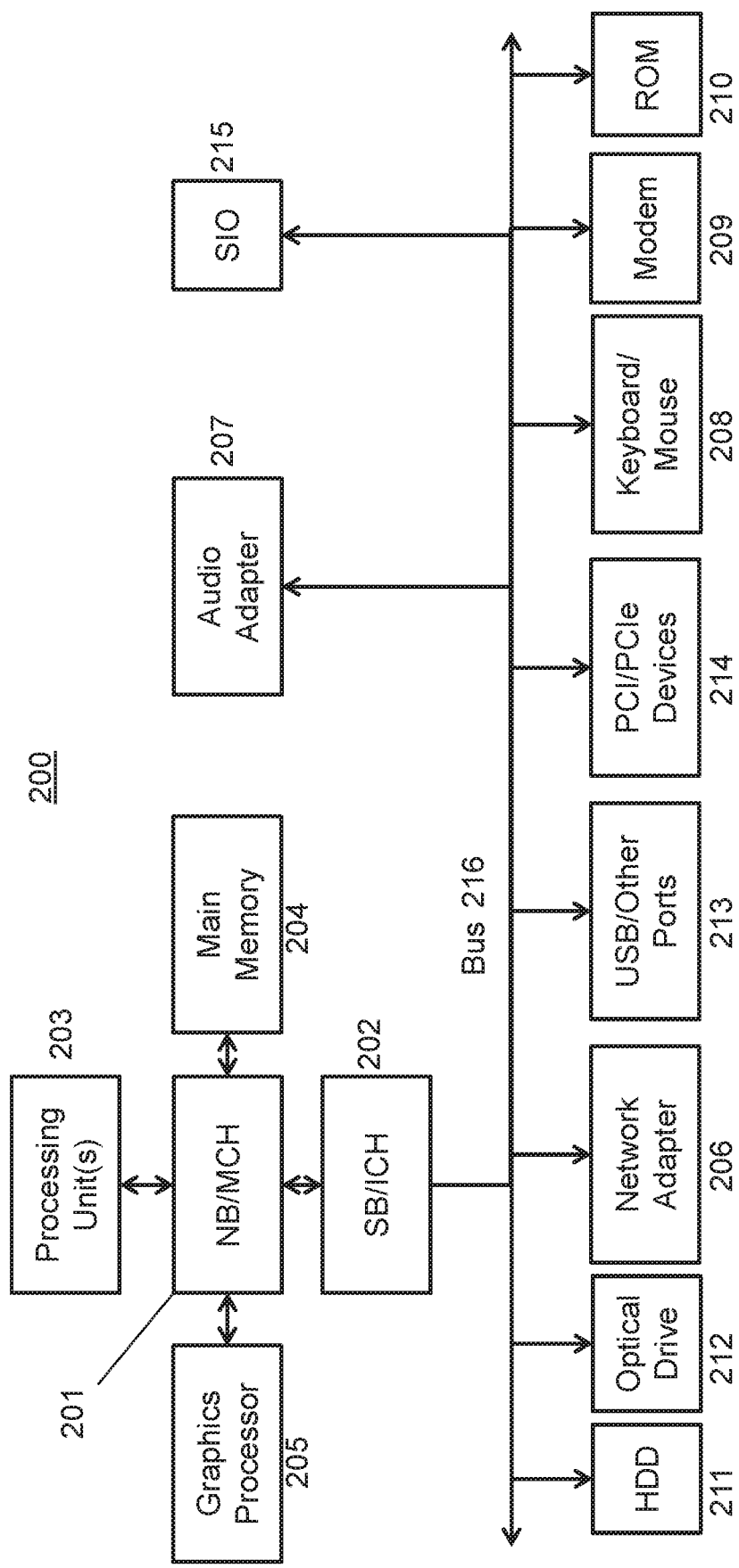
FIG. 2 is a block diagram of an example data processing system in which aspects of the illustrative embodiments may be implemented.

FIG. 2 is a block diagram of an example data processing system 200 in which aspects of the illustrative embodiments are implemented. Data processing system 200 is an example of a computer in which computer usable code or instructions implementing the process for illustrative embodiments of the present invention are located. In one embodiment, FIG. 2 represents a local computing device, such as the client device 110, which implements at least some of the aspects of the web site navigation system 100 described herein. The data processing system 200 may additionally or alternatively represent a server computing device, such as device which corresponds to action device 120 and/or learning device 130 for implementing at least some of the aspects of the website navigation system 100.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processing device 205 can be connected to the NB/MCH 201. Graphics processing device 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System P® running the Advanced Interactive Executive operating system or the Linux operating system. The data processing system 200 can be a symmetric multiprocessor (SMP) system that can include a plurality of processing devices in the processing unit 203. Alternatively, a single processing device system may be employed.

Instructions for the operating system, the object-oriented programming system, and applications or programs are located on storage devices, such as the HDD 211, and are loaded into the main memory 204 for execution by the processing unit 203. The processes for embodiments of the website navigation system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the data processing system 200 includes several components which would not be directly included in some embodiments of the client device 110. However, it should be understood that a client device 110, such as a smart speaker or smart phone, may include one or more of the components and configurations of the data processing system 200 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
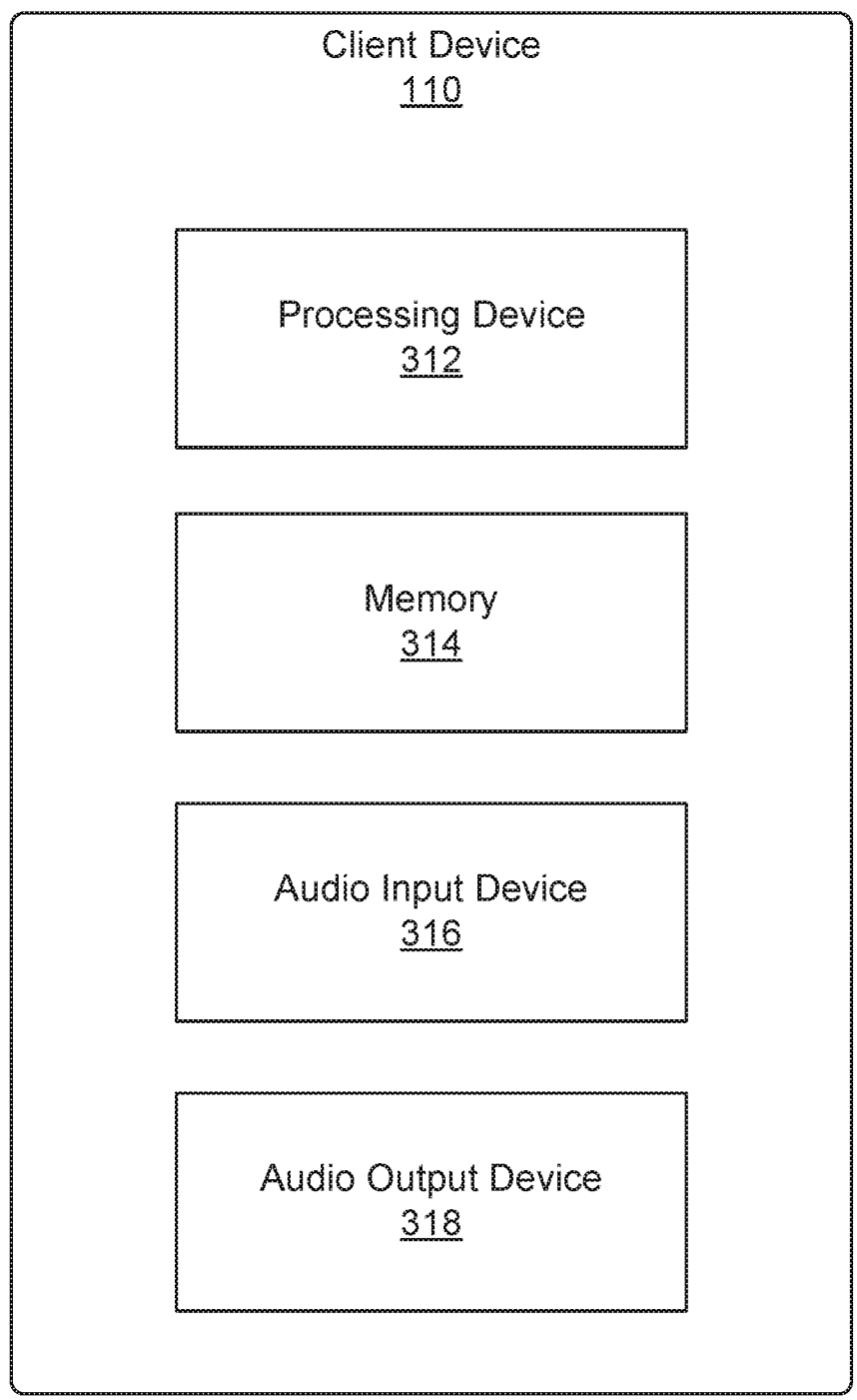
FIG. 3 further depicts an exemplary client device of the website navigation system, consistent with disclosed embodiments.

FIG. 3 further illustrates an exemplary embodiment of the client device 110. As described herein, the client device 110 may be a user-interfacing device which receives input from the user and provides output to the user. The client device 110 may include a processing device 312, a memory 314, an audio input device 316, and an audio output device 318.

The processing device 312 and memory 314 may be general or specialized computing components configured to store and execute software instructions in order to carry out one or more of the processes or steps described herein. The audio input device 316 may be a general or specialized device which is configured to capture audio data. For example, the audio input device 316 may be a microphone integrated into the client device 110. The audio output device 318 may be a general or specialized device configured to output audio. For example, the audio output device 318 may be a speaker integrated into the client device 110.

The client device 110 is preferably configured to recognize voice commands as input through the audio input device 316 and produce audio output in the form of electronic speech through the audio output device 318 in order to communicate with the user. The audio input device 316 may be configured to capture sufficient audio data to allow the processing device 312 to differentiate different elements such as sounds, words, and/or tone of voice. The audio output device 318 may be configured to output a range of sounds and tones at varying audible volume.

The client device 110 may be a commercially-available device, such as any of a variety of smart speakers, smart phones, or tablets, which include the components shown in FIG. 3 for capturing, providing, and processing audio data. In other embodiments, the client device 110 may be a specialized device for implementing the website navigation system 100. The client device 110 may include additional components, such as a visual input/output device (e.g., a touch screen). The client device 110 also may include a network connection component which allows the client device 110 to connect to the network 140 and/or directly connect to other elements of the website navigation system 100. For example, the client device 110 may include WiFi, Ethernet, and/or Bluetooth® capabilities.

Figure 4:
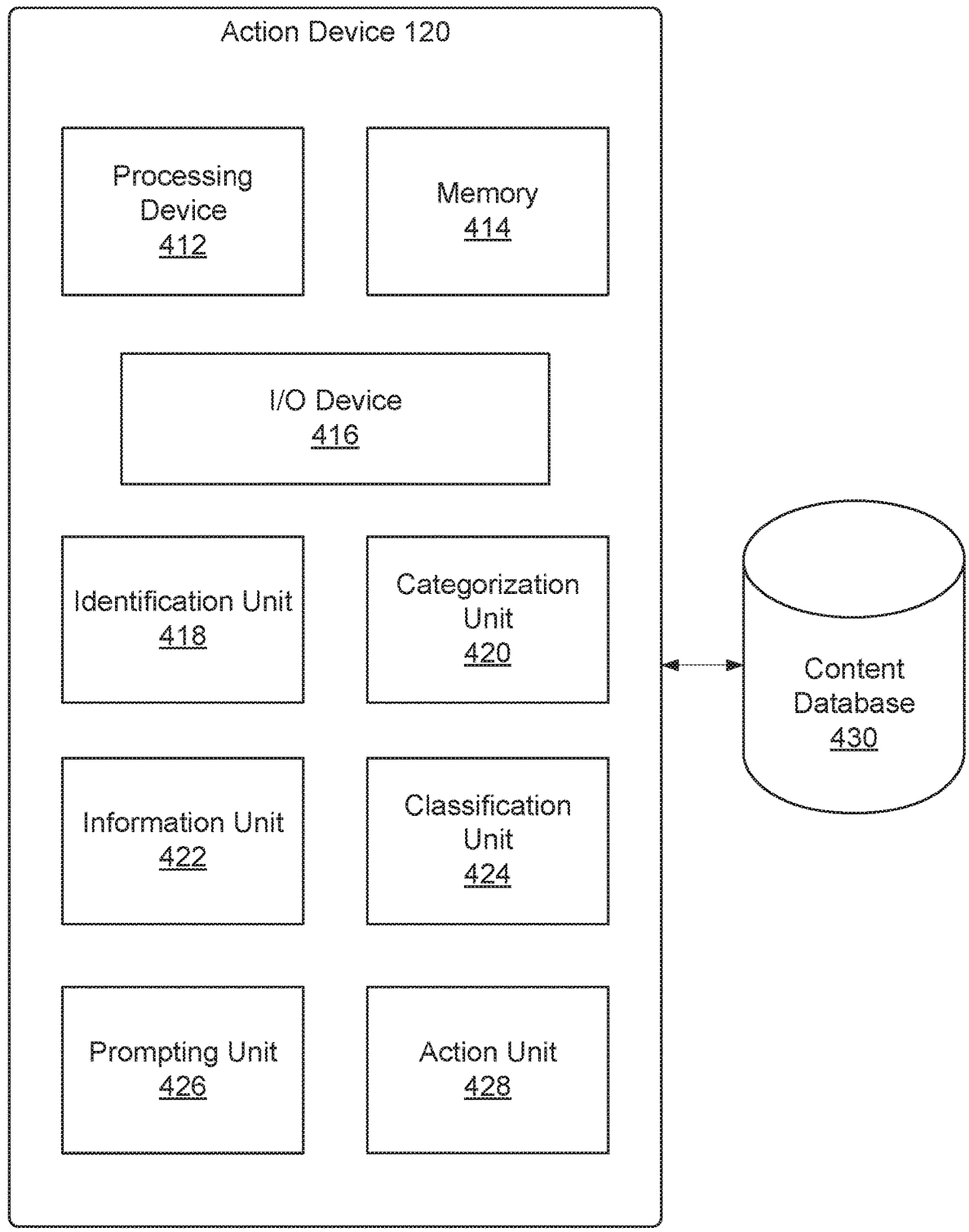
FIG. 4 further depicts an exemplary action device of the website navigation system, consistent with disclosed embodiments.

FIG. 4 further illustrates an exemplary embodiment of the action device 120. The action device 120 may be a backend device which interfaces with the client device 110 through network 140 or may be built into the client device 110. The action device 120 may include a processing device 412, a memory 414, and an I/O device 416. The action device 120 may further include a plurality of modules or units which are implemented through hardware and/or software. In an exemplary embodiment, the action device 120 includes an identification unit 418, a categorization unit 420, an information unit 422, a classification unit 424, a prompting unit 426, and an action unit 428. In one embodiment, these modules are stored in the memory 414 and executed by the processing device 412. The action device 120 may further include or be connected to a content database 430.

The processing device 412, memory 414, and I/O device 416 may be general or specialized computing components configured to store and execute software instructions in order to carry out one or more of the processes or steps described herein. The processing device 412 is configured to send and receive data (i.e., through the I/O device 416) in order facilitate one or more processes associated with the website navigation system 100. For example, the processing device 412 may receive audio data from the client device 110, analyze the audio data, and produce an action response for returning to the client device 110. In another example, the processing device 412 may receive website data, analyze the website data, and transmit information to the client device 110 for providing to the user. The I/O device 416 may include one or more interfacing elements which connect the action device 120 to other components within or outside of the website navigation system 100. For example, the I/O device 416 may be associated with a web browser and/or Internet connection which provides website data to the action device 120.

The identification unit 418 is configured to analyze website data to identify various elements within the website and the associated web pages, as well as to identify patterns in the data which may be useful for categorizing or grouping constituent elements of the website. For example, the identification unit 418 receives a data set corresponding to a web page or a plurality of web pages (i.e., a website or multiple websites) and parses the data to identify clickable elements (i.e., links) within each web page.

In one example, the identification unit 418 may extract HTML patterns from the links to identify different link types within the web page. The identification unit 418 may search for a pattern in which elements include different text but share a common format. For example, some links within a web page may include a common CSS style which matches other links on the web page. Some patterns may match across different web pages or web sites and may be present only once. For example, the identification unit 418 may identify elements such as a search bar, buy button, home button, etc. The identification unit 418 may also identify elements which appear only once and only on a particular website or web page.

The identification unit 418 may also identify navigational elements of a screen. These elements may include header/footer elements which appear across multiple web pages of the same website (e.g., a navigation bar at the top of the page and a site map at the bottom of the page). The identification unit 418 may analyze the associated HTML code and identify words such as "header," "footer," or "nav" to classify the underlying elements as navigation elements.

The categorization unit 420 is configured to group and organize the elements of the web page. The categorization unit 420 may use information extracted by the identification unit 418 in order to organize the various elements of the web page. For example, the categorization unit 420 may use an identified pattern to group a set of clickable elements and categorize them based on the HTML code associated with each element. The categorization unit 420 may also group features such as paragraphs of content (e.g., elements which are not clickable). In one example, the categorization unit 420 may group all navigation elements of a web page. The grouping and categorization of elements of a web page allows the action device 120 to treat groups of elements differently when presenting the information from a web page and determining answers to user requests.

The categorization unit 420 may also determine a name for each group or category of elements, such as "headlines" or "advertisements" or "people." The categorization unit 420 may also determine a name for each individual element within each group or category. The categorization unit 420 may determine the name for each group or individual element automatically (i.e., based on the text of the elements) or may be programmed manually by a user. The categorization unit 420 may look to fill certain predetermined names for each web page. For example, the categorization unit 420 may find a "buy" button, a search bar or button, a home button, etc. In this way, frequent web affordances may have the same name. For one-off elements, the link text may become the name used by the categorization unit 420. For elements which use a similar link format, the categorization unit may infer a name from the underlying code. For example, the categorization unit 420 may extract all valid English words from the HTML code. In another example, the categorization unit 420 may look for a caption within an HTML element that serves as a container for a group of elements, if the links appear together. For example, a group of headlines on the home page of a news website may be grouped and named "headlines" with each individual headline link being named as the associated headline.

The information unit 422 is configured to obtain and provide relevant information associated with identified elements and categories of elements. For example, the information unit 422 may obtain usage statistics for each clickable element. The usage statistics provide the action device 120 with contextual information which allows the action device 120 to compare different elements of a web page and prioritize elements which are selected (e.g., "clicked on") by the most users. This allows the action device 120 to sort the elements of a web page by popularity and present information which is most likely to be relevant before other information.

The information unit 422 may obtain the relevant information from any available source, such as a browser, accessibility tool, Internet Service Provider, web site, monitoring service, etc. The information unit 422 may communicate with a third-party source, such as a device associated with a monitoring service, through the network 140, in order to obtain usage statistics for the clickable elements of a web site.

The classification unit 424 is configured to analyze a web page and classify the web page as a whole. For example, the classification unit 424 may classify a web page as an action page or a content page. Action pages, for example, are web pages where users are expected to make a decision that will lead to another page. A website home page is an example of an action page. A content page may be a web page which is primarily constructed to provide information which a user would typically read, such as a news article or product description. Most content pages contain potential actions, including the possibility of links embedded within the content text. The classification unit 424 is configured to classify a web page and store the classification in the memory 414.

The identification unit 418, categorization unit 420, information unit 422, and classification unit 424 are collectively and cooperatively configured to analyze website data to organize the information into a form which allows the website and its constituent web pages to be presented in a format which is efficient and intuitive and in the form of an audible conversation. The identification unit 418 may separate the web site into web pages and individual elements on the web pages (e.g., links and content). The categorization unit 420 may conveniently group and organize these elements for being recalled. For instance, the categorization unit 420 may anticipate the manner in which web page data may be requested and organize the information accordingly. The information unit 422 may provide additional information to the organized data, such as popularity of the various elements, in order to provide a contextual filter which is also useful in determining how to efficiently present the information. The classification unit 424 provides an additional layer and context to the elements by identifying the type of page one which the element is presented. The type of page provides additional information which is useful in anticipating a likely request from a user and providing the information in an intuitive and efficient manner.

The prompting unit 426 and action unit 428 are configured to facilitate a conversation with a user in order to provide information from a website in an audible format and respond to requests from the user. In an exemplary embodiment, the prompting unit 426 is configured to use the information collected and organized by the identification unit 418, categorization unit 420, information unit 422, and classification unit 424 to generate a prompt to be provided to a user. For example, the prompting unit 426 may generate a prompt which describes the contents of a web page and invites a user to take an action. The prompting unit 426 may also receive voice command information from the client device 110 and use this information in generating a prompt. For example, the client device 110 may provide instructions regarding a user request and the prompting unit 426 may prepare a prompt which responds to the user request. The action unit 428 is also configured to receive voice command information from the client device 110 and determine an action based on the request. For example, the action unit 428 may advance to a new website or web page.

The content database 430 may be a data storage location which stores information related to the action device 120. For example, the content database 430 may store element categories, link names, web page classifications, or information sources and associated instructions. In some instances, the content database 430 may archive user requests and/or generated prompts from virtual conversations with a user.

Figure 5:
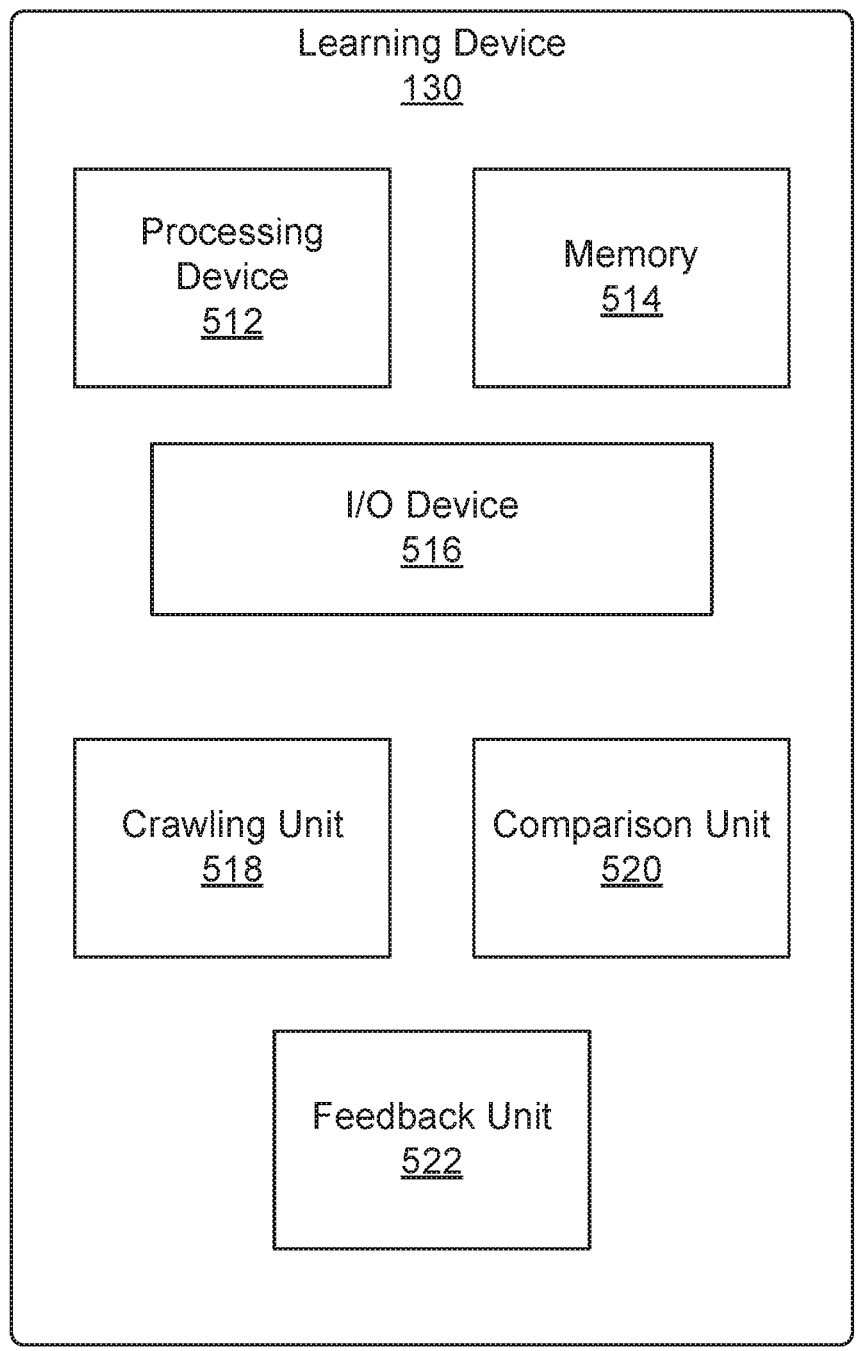
FIG. 5 further depicts an exemplary learning device of the website navigation system, consistent with disclosed embodiments.

FIG. 5 further illustrates an exemplary embodiment of the learning device 130. The learning device 130 may be a backend device which interfaces with the client device 110 through network 140 or may be built into the client device 110. The learning device 130 may be integrated with the action device 120, such as a backend server which communicates with the client device 110 through the network 140. The learning device 130 may include a processing device 512, a memory 514, and an I/O device 516. The learning device 130 may further include a plurality of modules or units which are implemented through hardware and/or software. In an exemplary embodiment, the learning device 130 includes a crawling unit 518, a comparison unit 520, and a feedback unit 522.

The processing device 512, memory 514, and I/O device 516 may be general or specialized computing components configured to store and execute software instructions in order to carry out one or more of the processes or steps described herein. The processing device 512 is configured to send and receive data (i.e., through the I/O device 516) in order to facilitate one or more processes associated with the website navigation system 100. For example, the processing device 512 may receive website information from the Internet (e.g., via the network 140). The I/O device 516 may include one or more interfacing elements which connect the learning device 130 to other components within or outside of the website navigation system 100. For example, the I/O device 516 may receive feedback information from a user.

The crawling unit 518 is configured to collect web site information for use by the website navigation system 100. For example, the crawling unit 518 is configured to direct a web browser to a particular Internet address and obtain the underlying code for the associated web page, including each of the elements of the web page. The crawling unit 518 may provide the obtained information to the action unit 120 for analysis, organization, and generation of prompts.

The comparison unit 520 is configured to compare website data to previously-obtained website data to identify any differences, because some web pages change over time. For example, the home page of a news website is constantly updated to reflect new headlines, articles, images, etc. The comparison unit 520 is configured to identify changes in the data of a web page and provide that information to the action device 120 to update the organized data associated with the web page (e.g., update the stored headlines, sale items, articles, playable media, etc.).

The feedback unit 522 is configured to receive feedback from one or more locations connected to the learning device 130. For example, a user may manually classify web pages as action or content pages, with the classification being received by the learning device 130. In another example, a user may provide feedback that a response to a prompt was incorrect and the feedback unit 522 may flag the interaction for review by an administrative user.

In one embodiment, the learning device 130 is associated with an administrative entity which manages the website navigation system 100. The learning device 130 in this instance may be a terminal, such as a personal computer, which allows a user to review web sites and manually provide information, such as a name for particular elements, groups of elements, or the web page as a whole, page classifications, priority filters for elements, identification of advertisements, contextual information, and the like. The learning device 130 is configured to provide this additional information to the action device 120 for use in organizing website data and providing prompts and responses to the client device 110.

Figure 6:
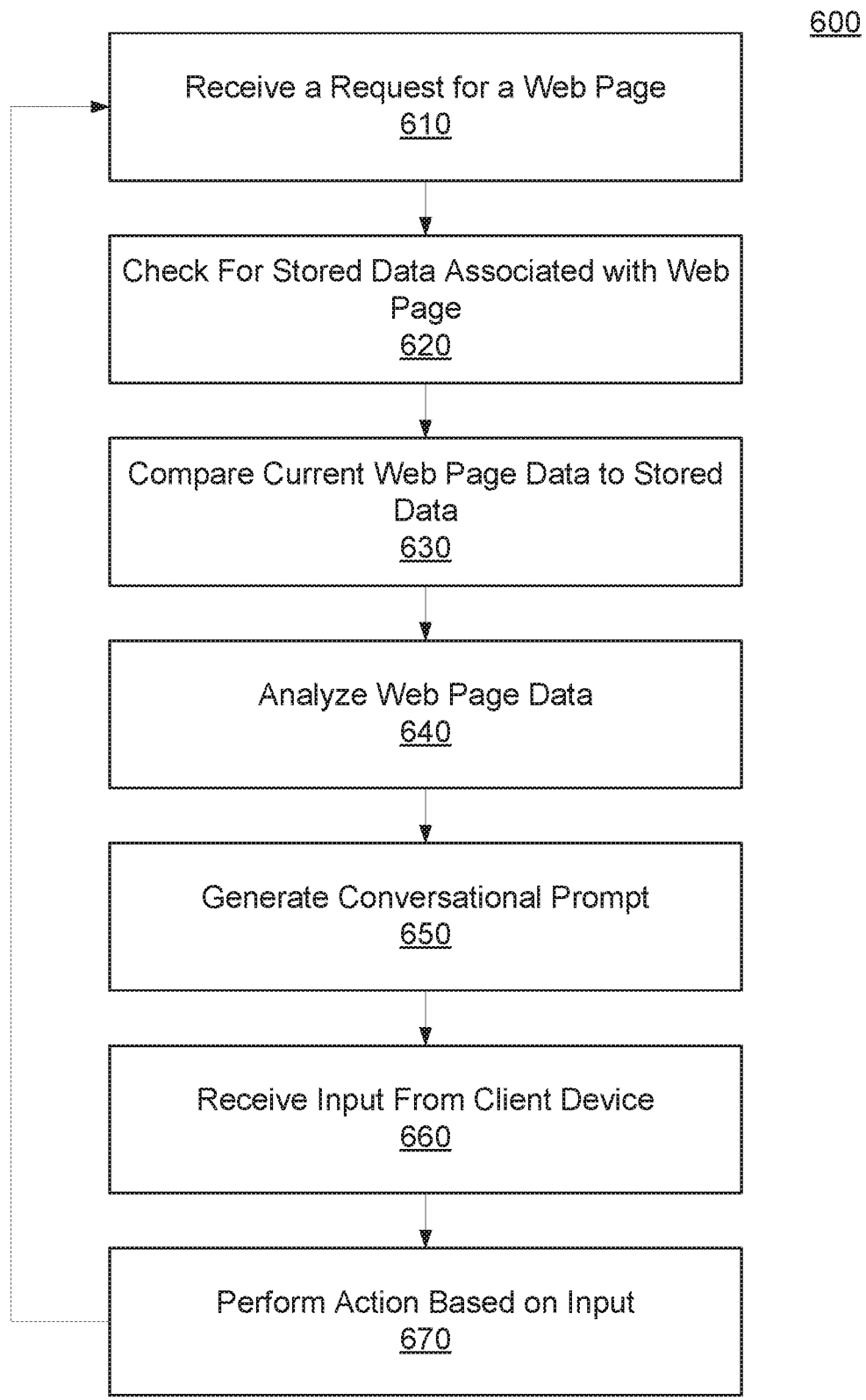
FIG. 6 is a flowchart of an exemplary website navigation process, consistent with disclosed embodiments.

FIG. 6 is a flowchart of an exemplary process 600 for enabling a virtual conversation between a user and a website. One or more of the client device 110, action device 120, and learning device 130 may perform one or more steps of the process 600 in order to provide information from a website to a user through audible output. In some embodiments, the analysis system 150 performs one or more steps of the process 600. The analysis system 150 may include one or more of the features of the action device 120 and learning device 130.

In step 610, the analysis system 150 receives a request for a web page. For example, the action device 120 may receive a request from the client device 110. In one example, the user may provide input to the client device 110 through the audio input device 316. For instance, the user may ask the client device 110 to go to a particular web page. The client device 110, through the processing device 312, may transmit data which identifies the name of the requested web page to the action device 120.

In step 620, the analysis system 150 checks for stored data associated with the requested web page. For example, the processing device 412 may communicate with the memory 414, content database 430, crawling unit 518, and/or feedback unit 522 to identify any previously-stored information associated with a web page. For example, if a web page was previously requested at an earlier time and process 600 carried out with respect to that web page, the analysis system may have stored information about the web page, such as the types of links on the page, navigation information, content, grouping of links, link patterns, etc.

In step 630, the analysis system 150 compares current web page data to stored data. For example, the crawling unit 518 may communicate with a device hosting the requested web page on the Internet (e.g., using the network 140) and receive the underlying web page data. The comparison unit 520 may compare the current data to stored data obtained in step 620. The result is an updated data set which includes current web page data and any associated information from previous analysis of the same web page. If it is the first time that the web page is being accessed, the updated data set may include only the data pulled from the Internet. The comparison unit 520 may provide the updated data set to the action unit 120.

In step 640, the analysis system 150 analyzes the web page data. For example, the action unit 120 may perform one or more processes which parse the updated data set received from the learning device 130. The analysis system 150 reorganizes and groups the data in a form which is convenient for being presented to the user in an audio format, as described herein. For example, the analysis 150 system may categorize links into groups which can be provided to the user. The analysis system 150 may also determine some general context or navigation elements associated with the web page for being provided to the user.

In step 650, the analysis system 150 generates a conversational prompt. In one embodiment, the prompting unit 426 of the action device 120 uses the analyzed web page data to determine a conversational prompt. The conversational prompt may be any output associated with the requested web page and configured to be output as audio to the user. For example, after a web page is analyzed, a first conversation prompt may be to provide a plurality of link group options to the user, such as, "Please select from the following: headlines, articles, authors, or navigation elements." In another example, the conversational prompt may be a presentation of all or selected elements on the web page with priority given to selected elements (e.g., the most popular links). The analysis system 150 may send the conversational prompt to the client device 110 for being output as audio by the audio output device 318.

In step 660, the analysis system 150 receives input from the client device 110. The input may be a selection or instructions from the user which is captured by the audio input device 316 of the client device 110 and transmitted to the analysis system 150. For example, the client device 110 may capture user speech in response to the conversational prompt from step 650 and forward the instruction to the action device 120. The input may include a selection of a group of links, such as "read me the headlines" or may be a selection of a particular link on the page, such as a "go to the second article." The client device 110 may use voice recognition and/or audio analysis to determine a corresponding instruction to send to the action device 120.

In step 670, the analysis system 150 performs an action based on the received input. In one embodiment, the action unit 428 performs an action process, which may include, for example, communicating with a web hosting device to navigate a web site based on input from the user. For example, the analysis system 150 may navigate to a new web page by selecting a link that was requested by the user. If the user selected a particular headline, the action unit 428 may direct the action device 120 or learning device 130 to receive web site data from the new web page. In another example, the analysis system may input text to an input area, such as a search bar, and provide the input request to the web page (e.g., enter the search to return results).

Through process 600, the analysis system 150 is able to navigate a web page by providing audio output through the client device 110 and receiving corresponding audio input. After step 670, the process 600 may be continuously repeated to allow for continued navigation of the website and/or a new navigation process of another website. In other words, the user may provide voice input which causes the analysis system 150 to navigate to different web pages, provide information on the web pages including content and options for continuing to different parts of a website.

Figure 7:
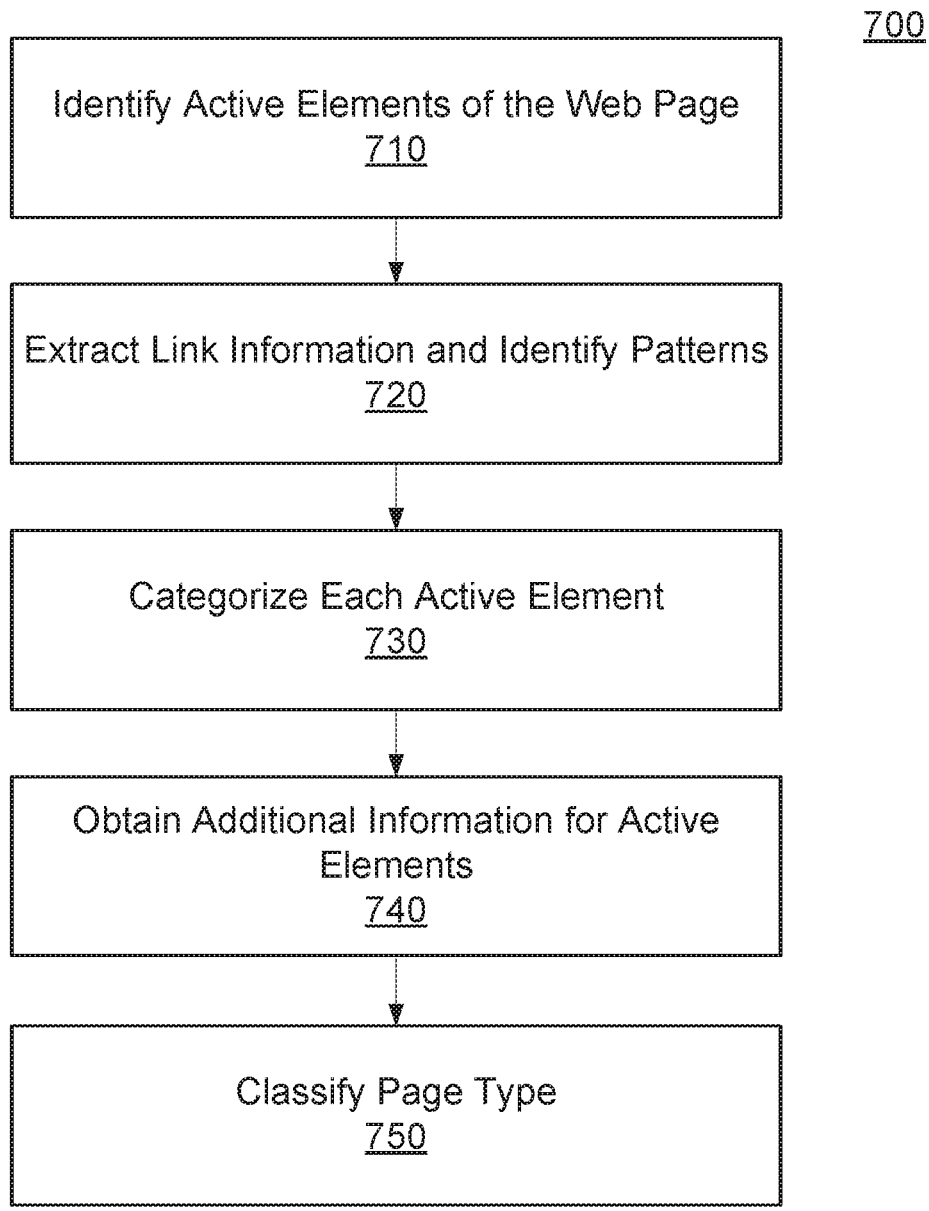
FIG. 7 is a flowchart of an exemplary web page data analysis process, consistent with disclosed embodiments.

FIG. 7 is a flowchart of an example process 700 for analyzing website data associated with a web page. The process 700 may correspond to step 640 of process 600. In one embodiment, one or more components of the analysis system 150, such as the action device 120, may perform one or more steps of process 700 in order to sort and organize web page data such that the data is in a format which can be presented intuitively and efficiently to the user with content and selection options for both understanding the information on the page and allowing the user to easily move to other related web pages to receive additional information. Through exemplary process 700, the analysis system 150 is configured to organize web page elements according to one or more rules stored in the memory 414. This may include naming and grouping the elements and retrieving rules associated with names and groups which allow the prompting unit 426 to decide how to present the information and the action unit 428 to decide what action to take when a particular selection or request associated with the web page is received. However, it should be understood that other processes or steps other than those described in process 700 may be used to organize web page data for use in the website navigation system 100.

In step 710, the analysis system 150 identifies active elements of the web page. In one embodiment, the identification unit 418 parses the web page data to look for individual elements on the page. Some of the elements are active elements or "links" to other web pages or content. The active elements may include embedded elements such as multimedia elements which play a video or audio recording. Other active elements may include input elements which require a user to provide text input, choose from a dropdown menu, or select a radio button. Elements which are not active elements may be considered inactive elements. These may include text which is not "linked" to anything, such as the text of an article or a social media post.

In step 720, the analysis system 150 extracts information from the identified elements of the web page data. In one embodiment, the categorization unit 420 reviews the code associated with each element in the web page data to extract information such as patterns, text, navigation elements, etc. For example, each active element may include an associated HTML code string. The categorization unit 420 (or other component of the analysis system 150) may parse the string to look for patterns of characters, text, prefixes, etc., in order to distinguish each element from each other.

In step 730, the analysis system categorizes the elements based on the extracted information. In one example, the categorization unit 420 determines a link type and a name for each active element. The categorization unit 420 may identify the link type by using a rule which defines a particular HTML pattern as a particular link type. Further the name for each element may be based on a rule and may include text from the HTML code. The categorization unit 420 groups the elements by link type.

In some embodiments, the categorization unit 420 may identify web page elements as navigation elements, such as those usually found in the header and/or footer of a web page. The categorization unit 420 may identify these elements from the extracted information (e.g., based on features of the associated code string). The categorization unit 420 may mark navigation elements so that the prompting unit 426 can avoid repeating these elements and/or form them into a separate navigation menu which is output upon request.

In step 740, the analysis system 150 obtains additional information for each of the active elements. For example, the information unit 422 may communicate with another inside or outside of the website navigation system 100 for rules or information which is to be associated with categorized elements. In one example, the information unit 422 may communicate with a third-party device (e.g., a device associated with a web browser, accessibility tool, ISP, website, or monitoring service) to obtain usage statistics for each active element. The usage statistics may identify the popularity of each link by providing the relative number of "clicks" or times an element has been selected over a period of time. In another example, the information unit 422 may communicate with the learning device 130 to identify rules based on feedback or input from a user. The information unit 422 is configured to store the additional information together with the categorized web page data. In one example, the categorization unit 420 may filter the grouped elements. In addition or alternatively, the information unit 422 may provide rules to the prompting unit 426 and/or action unit 428 which are used in generating prompts and/or performing actions, respectively.

In step 750, the analysis system 150 classifies the web page. In one embodiment, the classification unit 424 uses one or more rules to determine a page type in order to provide context for the prompting unit 426 and action unit 428. For example, the classification unit 424 may determine whether the web page is an action page or a content page. Depending on the page type, different prompts may be used and/or actions taken. For example, if the classification unit 424 identifies a page as an action page (such as a home page of a site), the prompting unit 426 may first generate a general overview of the page and provide options to the user for selecting a next web page. On the other hand, if the web page is a content page, the prompting unit 426 may customize a prompt to ask the user whether the content should be read or may simply begin reading the content. In another example, the classification unit 424 may determine a type of the website, such as a news site, search engine, social media site, etc.

The classifications determined by the classification unit 424 provide additional context which the categorization unit 420 may use in categorizing and naming the elements, the information unit 422 may use in determining what additional information to find, the prompting unit 426 may use in generating a prompt, and/or the action unit 428 may use in determining how to act in response to a request. For example, a news website may have certain link types that would not be found on a social networking site. The categorization unit 420 may use "headline" and "article" categories for the news site and "person" and "entity" categories for the social media site. Similarly, the information unit 422 may retrieve usage statistics for a news site by obtaining "click" information from a third-party source and retrieve "likes" or "favorites" from a social media site. The prompting unit 426 may prioritize headlines and articles from the news site and most recent posts on the social media site. The prompting unit 426 may also use different navigation menus for different web page classifications. Any or all of the components of the analysis system 150 may customize actions based on the type of web page.

The process 700 includes steps and processes which allow the analysis system to organize web page data into a form which allows it to be presented to the user. For each page, the analysis system 150 may use the organized data to supply the client device 110 with output prompts which describe the page contents and invite the user to take actions. In addition, to the conversation prompts the website navigation system 100 may use sounds to carry information, such as page type (action or content), the website classification, type, or general topic, links within content, advertisements, etc. In some embodiments, the website navigation system 100 may use different voices to create virtual spatial awareness to further differentiate various elements of a web page. For example, one voice may be used to read headlines (thus indicating to the user that the link is a headline which can be selected to move to the associated news story) and a different voice to read navigation options associated with the website as a whole (indicating that a new action page is likely to be retrieved as a result of a selection of the navigation option).

A website navigation example may include a user speaking "Go to news.com" and the website navigation system 100 receiving website data associated with news.com. After analyzing the website data associated with news.com (including any information stored from previous analysis of the web page), the website navigation system 100 provides a home page menu to the user through the client device 110. The home page menu may include the following conversational prompt: "Do you want to listen to the navigation header, the headlines, read the top story, or learn more about additional articles on the page?" The user may say "Read the top story," which causes the action unit 428 to select a link associated with the top story, thereby navigating to the web page which has the top story, finding the content associated with the next web page, and reading the content to the user.

The processes and steps performed by the components of the website navigation system 100 may vary depending on factors including the client device 110, the websites which are crawled, the types of links, the patterns found in the links, the amount of user input and feedback, etc. In one embodiment, the website navigation system 100 is configured to adjust and modify processes as more websites are crawled and more page elements are analyzed. For example, as patterns emerge across multiple web pages, new features such as groups of elements, names for elements, data filters, prompts, etc., may be identified and used by the action device 120. Further, by comparing current web page data to previously-stored web page data, the analysis system 150 can provide more consistency to the user and "learn" more about the elements on the page. For example, the analysis system 150 may determine that certain features (such as a "buy" or "search" button) which is consistent across multiple pages and versions of the same page while other features are dynamic (such as a product on the page, an article, advertisements, etc.).

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method, in a data processing system comprising a processing device and a memory comprising instructions which are executed by the processing device to cause the processing device to enable a website for a virtual conversation, the method comprising:
receiving a request for an Internet web page associated with a website from a client device, the web page including a plurality of links, a plurality of first elements, and a plurality of second elements;
retrieving, by the processing device, web page data associated with the web page from a device connected to the Internet in response to the request;
analyzing, by the processing device, the web page data according to a data analysis process to produce an organized data set associated with the web page, wherein the data analysis process comprises:
identifying the plurality of links, the plurality of first elements and the plurality of second elements from the web page data, wherein the plurality of first elements include a search bar, a buy button, and a home button that appear frequently across different web pages, and the plurality of second elements include elements that appear only once and only on a particular web page;
naming each link with one or more valid English words extracted from an HTML code corresponding to each link;
naming each first element with a predetermined name;
naming each second element with corresponding link text;
generating, by the processing device, a prompt for being output to the user as audible output based on the organized data set;
receiving input from the client device provided to the client device in response to the prompt; and
performing, by the processing device, an action based on the input received from the client device, the action including retrieving web page data associated with a new web page based on the selection of a link by the user in response to the prompt.

2. The method of claim 1, wherein the organized data set comprises categories of links.

3. The method of claim 2, wherein the prompt comprises the categories of links as options for the user to select.

4. The method of claim 1, wherein the data analysis process comprises the links within the web page, obtaining usage statistics for the links, and sorting the links based on the usage statistics.

5. The method of claim 4, wherein the prompt comprises the sorted links with more popular links being presented to the user before less popular links.

6. The method of claim 1, wherein the input from the client device is received from an audio input device based on captured speech of the user.

7. The method of claim 1, wherein the data analysis process comprises:
identifying the separate elements of the web page, the separate elements comprising links and inactive content;
categorizing the links into a plurality of groups based on one or more of the associated HTML code or a web page type;
sorting the categories based on usage statistics associated with the links; and
generating a prompt which includes the sorted categories of links for sending to the client device and being output by the client device as an audio prompt.

8. A website navigation system, comprising:
an analysis system connected to an Internet and comprising a processing device configured to execute software instructions to:
receive a request for an Internet web page associated with a website from a client device, the web page including a plurality of links, a plurality of first elements, and a plurality of second elements;
retrieve web page data associated with the web page from a device connected to the Internet in response to the request;
identify, by an identification unit, the plurality of links, the plurality of first elements, and the plurality of second elements from the web page data, wherein the plurality of first elements include a search bar, a buy button, and a home button that appear frequently across different web pages, and the plurality of second elements include elements that appear only once and only on a particular web page;
name, by a categorization unit, each link, with one or more valid English words from an HTML code corresponding to each link;
name, by the categorization unit, each first element with a predetermined name;
name, by the categorization unit, each second element with corresponding link text;
generate, by a prompting unit, a prompt for being output to a user by the client device as audible output based on the identified links and elements, the prompt comprising a name generated by the categorization unit.

9. The website navigation system of claim 8, wherein the analysis system is further configured to receive input from the client device provided to the client device in response to the prompt.

10. The website navigation system of claim 9, wherein the analysis system is further configured to perform, by an action unit, an action based on the input received from the client device, the action including retrieving web page data associated with a new web page based on the selection of a link by the user in response to the prompt.

11. A client device, comprising:
an audio input device configured to receive audio input from a user;
an audio output device configured to provide audio output to the user;
a memory configured to store software instructions; and
a processing device configured to execute the software instructions to:
receive input data from the audio input device based on an audible message from the user;
identify a web page from the input data, the web page including a plurality of links, a plurality of first elements, and a plurality of second elements;
retrieve web page data associated with the web page from a device connected to the Internet in response to the request;
identify the plurality of links, the plurality of first elements, and the plurality of second elements that from the web page data, wherein the plurality of first elements include a search bar, a buy button, and a home button that appear frequently across different web pages, and the plurality of second elements include elements that appear only once and only on a particular web page;

name each link with one or more valid English words extracted from an HTML code corresponding to each link;

name each first element with a predetermined name;

name each second element with corresponding link text; and provide output data to the audio output device for providing a prompt based on the identified links and elements to the user as an audible message.

\* \* \* \* \*